United States Patent [19]

Lambert, Jr.

[11] 3,924,761

[45] Dec. 9, 1975

[54] HORIZONTAL ROTARY SWEEPS FOR FEED STORAGE TANKS

[75] Inventor: Charles F. Lambert, Jr., Louisville, Ky.

[73] Assignee: Clayton & Lambert Manufacturing Company, Buckner, Ky.

[22] Filed: Jan. 20, 1975

[21] Appl. No.: 542,222

Related U.S. Application Data

[63] Continuation-in-part of Ser. No. 416,680, Nov. 16, 1973, abandoned.

[52] U.S. Cl. .......................... 214/17 CB; 214/17 DB
[51] Int. Cl.² ................... B65G 65/32; B65G 65/38
[58] Field of Search .................... 214/17 CB, 17 DB

[56] References Cited
UNITED STATES PATENTS

| | | | |
|---|---|---|---|
| 3,045,841 | 7/1962 | Skromme | 214/17 DB |
| 3,229,827 | 1/1966 | Kucera | 214/17 DB |
| 3,297,177 | 1/1967 | Zeiter | 214/17 DB |

*Primary Examiner*—Robert G. Sheridan
*Attorney, Agent, or Firm*—Arthur F. Robert

[57] ABSTRACT

A horizontal rotary sweep of the radius-auger type is conventionally mounted on a vertically movable supporting assembly (which includes a center cable and peripheral ring gear) for vertical movement therewith and for slow tracking rotation about the common vertical axis of the ring gear and cable. The sweep is provided with a hole-former in the form of a centrally depending auger, which is reversibly rotatable about said common vertical axis. During the silo-filling, sweep-rising operation, the horizontal radius auger of the sweep rotates rapidly about its long horizontal axis in the direction necessary to move incoming silage (fibrous or particulate) outwardly from the center of the silo for spreading purposes while the depending auger is rapidly rotated to function as a cylindrical barrier which prevents the incoming silage from lodging within the cylindrical space of the barrier so that said incoming silage builds up a column around said barrier and thus forms a center hole entirely through the height of the silage column. The direction in which the depending auger rotates about its vertical axis is such that it substantially prevents incoming silage from passing downwardly through the mouth or top of that hole. During the silo-unloading, sweep-lowering operation, the horizontal radius auger of the sweep rotates in the reverse direction about its long horizontal axis to move silage inwardly toward the center discharge hole for silage unloading purposes while the vertically depending auger rotates in the reverse direction about its vertical axis to facilitate the discharge movement of silage downwardly from the mouth of the center discharge hole and thereby prevent bridging across the mouth. It also reams the discharge hole.

2 Claims, 3 Drawing Figures

U.S. Patent  Dec. 9, 1975  3,924,761
FIG. 1
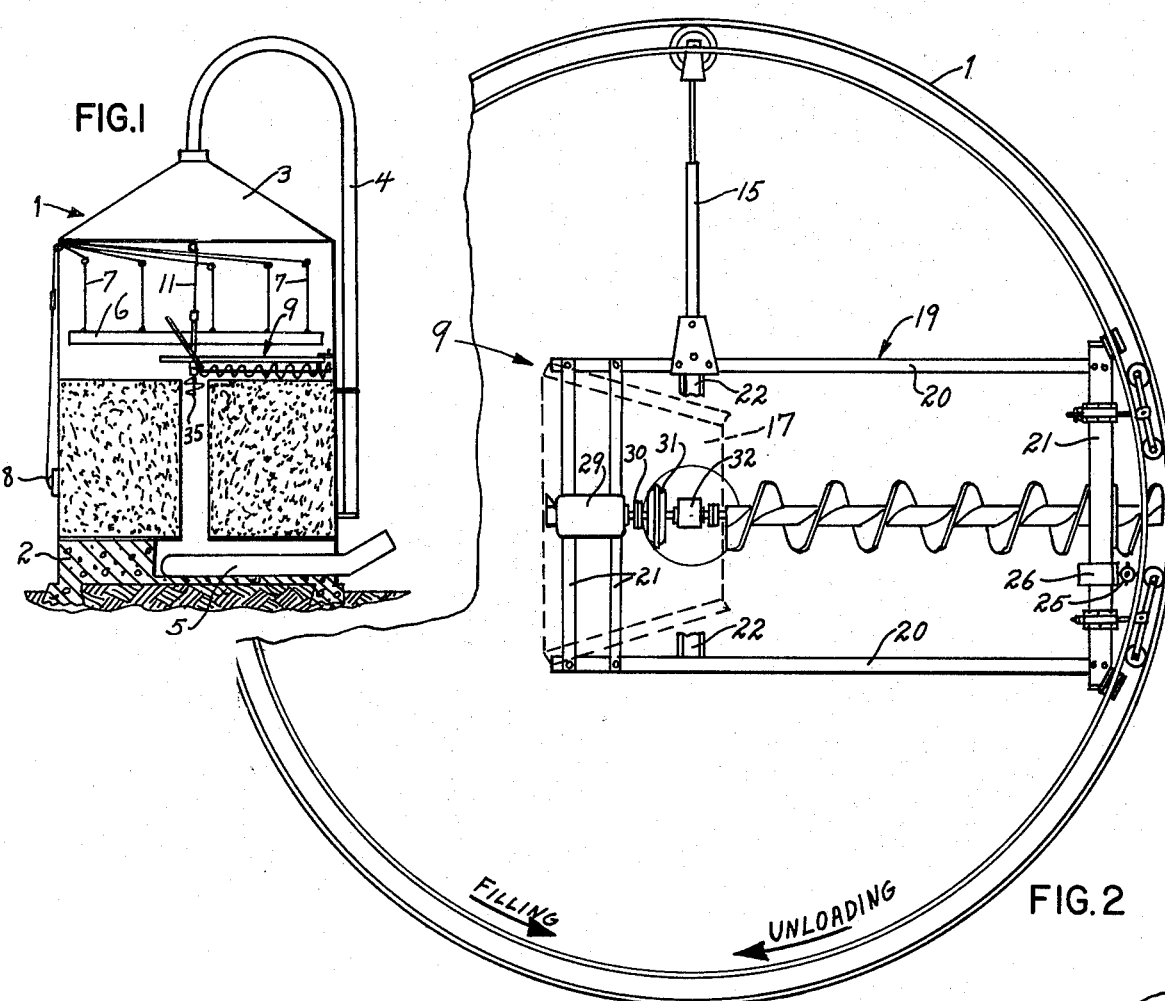
FILLING  UNLOADING  FIG. 2
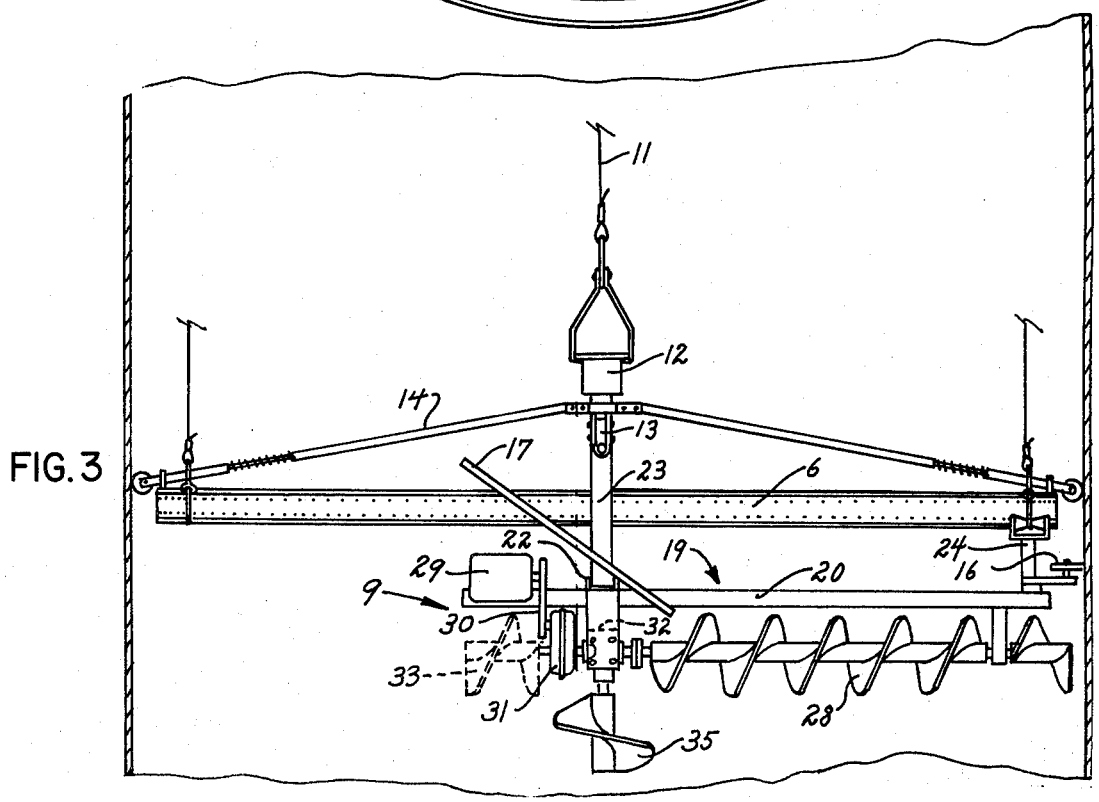
FIG. 3

HORIZONTAL ROTARY SWEEPS FOR FEED STORAGE TANKS

CROSS REFERENCE TO RELATED APPLICATION

This application is a continuation-in-part of my co-pending application Ser. No. 416,680 filed Nov. 16, 1973, now abandoned, disclosing a fully exposed centrally-depending auger-like barrier. My co-pending applications Ser. No. 425,308 filed Dec. 17, 1973, and Ser. No. 476,424 filed Apr. 25, 1974 both disclose and claim a depending auger in combination with a surrounding sleeve.

BACKGROUND OF THE INVENTION

1. Field Of The Invention

This invention relates to horizontal rotary sweeps, of the conveying auger or other spreading/unloading conveyor type, which are used in cylindrical feed-storage tanks, such as silos and the like and which may be designated as HR sweeps of the S/U type.

2. Description Of The Prior Art

Horizontal rotary sweeps of the aforesaid type are commonly used in feed-storage tanks, during a tank filling or loading operation, to spread incoming silage more or less uniformly through-out the cross-sectional area of the tank and contemporaneously form a silage discharge hole centrally through the rising column of silage; and, during a tank unloading operation, to remove silage from the top of the stored column and direct it inwardly toward and downwardly into said discharge hole. In some cases, the inwardly flowing silage bridges across the mouth of the discharge hole, which is objectionable.

It is old to mount a horizontal rotary sweep, of the spreading/unloading type, on a ring gear/cable assembly in the tank for horizontal sweeping or tracking rotation about the vertical axis of the ring gear, and to provide the sweep with a center hole-former in the form of a closed (or closable) vertical cylinder depending 2 feet to 5 feet from the sweep frame along the common centrally-disposed vertical axes of the ring gear and the sweep unit. In such devices, it is conventional: to use horizontal auger means (i.e., conveyors such as single or double conveying augers) which extend wholly (or partially) across either the radius of the tank or its diameter; to sweep the horizontal auger means about the vertical axis of the ring gear during both filling and unloading operations; to rotate the horizontal auger means one way about its long horizontal axis during the silo-filling silage-spreading operation; to rotate the horizontal auger means (the same way in some cases and reversely in others) during the silage-unloading operation; and to effect the manual removal of a closed hole-former, or open a closable hole-former, between filling and unloading operations so as to expose the discharge hole for unloading purposes. See Hazen U.S. Pat. No. 3,075,657 granted Jan. 29, 1963; Zeiter U.S. Pat. No. 3,297,177 granted Jan. 10, 1967.

The manual removal of a closed hole-former requires one or more operators to enter the silo between filling and unloading operations. Closable hole-formers sometimes jam in the hole during unloading due to the substantial narrowing of the hole as a result of the weight of the silage above the point where the jamming occurs.

SUMMARY OF THE INVENTION

Objects Of The Invention

The principal objects of the present invention are: to provide a novel and advantageous form of hole-former which functions, during a filling operation, as a cylindrical center-hole-forming barrier, and, during an unloading operation, as a means of facilitating the flow of silage downwardly through that hole; to provide a hole-forming rotary sweep unit, of the horizontal conveyor type, which is always ready not only to spread the incoming silage over the corss-sectional area of the storage tank and contemporaneously form a silage discharge hole through the center of the stored silage but also to perform the unloading operation without requiring the removal of the hole-forming barrier; to provide one which, during unloading, not only substantially prevents the silage being unloaded from bridging across the mouth of the center discharge hole but also reams the center discharge hole as the sweep is lowered and thereby prevents jamming; and to provide a rotary sweep, which does not require any person to enter the silo either during the filling operation or during the unloading operation or therebetween.

Statement Of The Invention

Most of the important objects of the present invention are achieved as follows: (1) using a vertically depending firmly mounted rotational auger to function as a cylindrical barrier which prevents the incoming silage from lodging within the cylindrical space of the barrier so that said incoming silage builds up a column around said barrier and thus forms a hole through the silage column during a filling operation and to maintain that hole in a properly open condition during the unloading operation; (2) equipping a rotary sweep with a reversible hole-forming vertical auger depending along the axis of sweep rotation; (3) during the silo-filling operation, rotating the depending auger in one horizontal direction about its vertical axis to form a center-hole and, at the same time, substantially prevent the flow of incoming silage downwardly through that hole; and (4) during the silo-unloading operation, rotating the depending auger in the opposite horizontal direction about its vertical axis to prevent bridging and jamming and promote reaming.

BRIEF DESCRIPTION OF THE DRAWINGS

The invention is illustrated in the accompanying drawings wherein:

FIG. 1 is a somewhat schematic vertical section through a cylindrical feed storage tank or silo, which contains a column of silage and which is equipped with an embodiment of my horizontal rotary sweep for contemporaneous silage-spreading and hole-forming purposes and for silage-removing purposes, this view omitting the auger drive means;

FIG. 2 is a horizontal section fragmentarily showing both the outer wall of the tank and the corresponding portion of the ring gear and also somewhat schematically showing my horizontal rotary sweep in top plan, this view showing a diverter board in dotted lines; and FIG. 3 is a vertical section showing the cylindrical wall of the tank and the annular ring-gear/center-cable assembly and also showing the rotary sweep in side elevation.

DESCRIPTION OF THE PREFERRED EMBODIMENT

Conventional Structure

FIGS. 1-3 somewhat schematically illustrate: a tank; a vertically-movable supporting assembly; a conventionally constructed rotary sweep unit in which my invention is incorporated; and other conventional structure. The cylindrical feed storage tank or silo 1 has a base 2, a top 3, a silage inlet pipe 4 which directs silage downwardly through the top of the tank 1 and a discharge conveyor 5 in the base 2. The supporting assembly includes a circular ring gear 6 supported within the tank by vertically movable cables 7, which are connected to an outside winch 8 for gear raising and lowering purposes. The rotary sweep 9 has its outer end mounted on the ring gear 6 for vertical movement with the ring gear and for one-fifth to one-tenth rpm motorized tracking rotation about the ring gear's vertical central axis, which more or less coincides with the vertical center of the tank 1. The supporting assembly also includes a centrally disposed vertically movable main suspension cable 11, which supports the inner end of the rotary sweep and is also connected to winch 8.

The remaining conventional structure illustrated includes: an electrical collector ring assembly composed of an outer stationary part 12 supported by center cable 11 and an inner rotary part 13 depending from within and supported by the outer part 12; a pair of stationary wall-engaging radius torque-arms 14 extending radially from and supported on the outer part 12 and connected to ring gear 6; a wall-engaging centering arm 15 extending radially from and supported on the frame of the rotary sweep for movement therewith; a series of frame-mounted wall-engaging bumper wheels 16; and a frame-mounted diverter board 17 mounted on the rotary sweep frame in position to intercept the incoming silage and direct it onto the conveyor of the rotary sweep 9. The inner end of the rotary sweep is rotationally suspended from the inner rotary part 13 of the collector ring.

The cable and ring-gear mounted rotary sweep 9 amy be of any conventional character comprising: a horizontal frame of diametric, radius or intermediate extent; and a frame-mounted motorized silage-moving conveyor of diametric, radius or intermediate extent. The specific sweep 9 illustrated, conventionally includes: a horizontal sweep frame of intermediate extent motorized for tracking rotation about the axis of the ring gear; and a horizontally-extending sweep-frame-mounted silage-moving radius conveyor reversibly motorized for spreading and unloading purposes.

The horizontal sweep frame 19 conventionally comprises laterally spaced longitudinally extending radial frame members 20 integrated along the length of the frame by transverse frame members 21 and a transverse upwardly-open channel member 22 extending horizontally through the rotary axis of the sweep from the top side of one long frame member 20 to the other frame member 20 and rigidly secured to both. The sweep frame 19 is supported at its opposite inner and outer end portions. Its inner end portion is supported at the rotational axis of the sweep by an inverted U-shaped transverse frame member 23, which depends from the inner rotary part 13 of the collector ring assembly, and which is composed of a transversely extending member in the form of a cross pipe and a pair of straps depending from opposite end portions of said cross pipe with their lower ends secured to the long frame members 19 of the sweep frame and opposite end portions of cross channel 22. The outer end of the sweep frame is supported from the ring gear 6 by vertical support members 24 depending from wheels, which are rotationally carried by the bottom flanges of the ring gear 6. The frame carries a tracking gear 25 in tracking engagement with the ring gear 6 and a motor 26 for driving the gear 25 to effect the tracking rotation of the sweep about the vertical axis of the ring gear 6.

While the silage-moving horizontal radius conveyor may be of any suitable character, as illustrated, it is in the form of a single radius auger 28 conventionally mounted at its inner and outer ends on rigid supports which depend from the sweep frame 19. The auger 28 is driven from sweep-frame-mounted drive motor 29 through belt 30, reduction gear 31 and gear box 32.

With the horizontal conveying auger 28 terminating at one side of the center discharge hole hereinafter described, I prefer to provide a one flight tail auger 32 located on the other side of said discharge hole and axially aligned with auger 28, which terminates adjacent said discharge hole. The tail auger 33 is not essential but its use may be desirable in some cases.

INVENTIVE STRUCTURE

In accordance with my invention, a hole-former in the form of single vertically depending rotary auger 35 is provided. It preferably is located with the top of its uppermost flight adjacent the bottom horizontal plane of the auger 28. It is firmly mounted to depend from gear box 32 and is connected through the gears of box 32 to the reversible drive motor 29. The depending hole-forming auger 35 may be of any suitable length, say 16 to 37 inches more or less, of any suitable diameter, and of any suitable pitch, a 16 inch length, diameter and pitch being preferred for a fully exposed auger.

This fully exposed auger rotates preferably at the same speed during both filling and unloading operations. During filling, it functions as a cylindrical barrier which prevents the incoming silage from lodging within the cylindrical space of the barrier so that said incoming silage builds up a column of silage around said barrier and thus forms a vertical axially-open-ended silage-discharge hole extending upwardly from the bottom of the rising column of silage as the rising rotary sweep spreads the incoming silage over the top of that silage column. The directions of rotation are such that it tends to move silage, which is directed into the top of said open-ended silage-discharge hole, upwardly during filling and downwardly during unloading. The speed of auger 35 rotation should be high enough to remove unloaded silage at least as fast as it receives it. With both conveyor 28 and auger 35 having a diameter and pitch of 16 inches and with conveyor 28 operating at 150 rpm, the minimum speed of rotation of auger 35 is about 150 rpm but it may be substantially increased, a maximum speed of about 200 rpm presently being indicated. Within those limits, the designer's choice of speed will normally depend in large part at least upon well known practical consideration.

Conventional Operation

In operation, the horizontal rotary sweep 9 may be conventionally rotated in horizontal sweep fashion at a slow speed of one-fifth to one-tenth rpm. The horizontal auger rotates rapidly about its long axis in one direction for filling and in the opposite direction for unloading. The sweep is conventionally moved upward during each filling operation for spreading purposes and downward during each unloading operation for stock feeding purposes. During filling, most of the incoming silage strikes the diverter board 17 and is directed onto the inner end of auger 28 which usually rotates one way about its long axis at speed about 150 rpm to move that silage outwardly and thus spread that silage as the rotary sweep rotates slowly about the vertical center axis of the silo. During unloading, the auger 28 rotates reversely about its long axis preferably at the same 150 rpm speed to move silage inwardly toward the center hole of the ring gear.

In conventional filling operations, some incoming silage may be deposited and piled up on the silage column adjacent that side of the discharge hole which is opposite the inner end of conveying auger 28. The prime function of the tail auger 33 is to remove this piled-up silage from the path of the common drive means 29–32 by feeding it either inward or outward.

Hole-Forming Operation

The results obtained, with a fully exposed hole-forming vertical depending auger 35, depend upon the nature of the silage. Thus, the results obtained in filling a silo with a fibrous silage, i.e., a grass/legume type such as alfalfa hay, soybean, etc., are better than the results obtained in filling the same silo under the same conditions with a finely chopped particulate silage, i.e., finely chopped corn stalk silage with or without the addition of grain corn.

Fibrous Silage

In filling a silo (19 feet diameter, 60 feet tall) with a fibrous grass/legume hay type of silage, specifically alfalfa, (using a 150 rpm conveying auger, 16 inches in diameter and pitch), I have obtained excellent hole-forming results with a fully exposed depending auger 16 inches in length, diameter and pitch operating at a speed of 150 rpm. It is convenient but not essential to have the pitch and diameter dimensions and operating speeds of both augers 28 and 35 the same but the speed of the barrier-forming auger 35 may range from about 150 rpm upwardly to the highest practical limit during operation. The hole formed through the fibrous haylage column was substantially straight, and smooth-walled throughout its extent. The bore of the hole around the depending barrier-forming auger 35 was uniformly about 16 inches in diameter but below the lower end of the auger 35, the bore decreasing somewhat due to the weight of the haylage above it. For all practical purposes, none of the incoming haylage moved downwardly past the depending auger 35.

To unload the silo, it was only necessary to reverse the direction of the conveying auger, to rotate the depending auger at a speed ranging from 150 to 300 rpm and in the direction necessary to move the fibrous silage downwardly, and then lower the sweep as required. In unloading the aforesaid silo with the aforesaid equipment, the depending auger 35 promoted the flow of fibrous silage downwardly into and through the mouth of the center discharge hole sufficiently to prevent the bridging of the fibrous silage across the mouth of the center discharge hole. The lower end of the depending auger 35 reamed the discharge hole wherever it had narrowed. In other words, the depending auger 35, which functioned as a cylindrical hole-forming barrier during the filling operation, reamed any narrow bore portions in that hole during the unloading operation; hence, jamming was not a factor.

Particulate Silage

With a particulate silage, specifically finely chopped corn stalks with grain added, (using similar sweep equipment and operating conditions in filling a silo, 30 feet diameter, 60 feet tall), I found that the hole formed through the silage column was somewhat irregular and comparatively rough walled throughout its extent. Despite its firm mounting, the depending auger 35 wabbled somewhat due largely to stress-induced movements and vibrations of the rotary sweep; hence, the bore of the hole formed immediately adjacent the 16 inches auger 35 was as big as 26 inches in diameter. Below the auger, the bore decreased, due to the weight of the silage above it, but the decreased bore appeared to be much larger than 16 inches. Also, a significant portion of finely and coarsely chopped incoming silage fell downwardly past auger 35 and dropped into the bottom discharge conveyor 5. This escaping silage can either be fed or recycled. Recycling, obviously, has its objections.

In unloading particulate silage, under the same operating conditons, the depending auger 35 promoted the flow of silage downwardly into and through the mouth of the center discharge hole sufficiently to prevent bridging.

While the rotary sweep of FIGS. 1–3 may be satisfactorily used in connection with the loading and unloading of both fibrous and particulate silage, its use in connection with fibrous silage is much more satisfactory, hence, preferred, particularly from a leakage standpoint.

It will be appreciated that I have produced an improved hole-former for use in a storage feed tank or silo comprising: a rotatable vertically-depending auger 35 having a longitudinal center axis about which it may be rotated; and means for mounting that vertically-depending rotating auger within a silo not only for rising movement through a column of silage so that it functions as a cylindrical barrier which forms a vertical silage discharge hole therein but also, as the top of said column is lowered by a silage unloading operation, for rotational movement in the top end portion of said hole and for contemporaneous lowering movement to maintain said hole open. The hole maintained satisfactorily open by the depending auger which prevents the silage from bridging over the mouth of the hole and which reams reduced portions of the hole as it is lowered downwardly therethrough.

Having described my invention, I claim:

1. An apparatus for use in filling and unloading feed storage tanks or silos having a vertically movable non-rotatable supporting assembly, comprising:
   A. means for mounting a horizontaal rotary sweep of the spreading/unloading type on said vertically movable support assembly
      1. for raising and lowering movement therewith during respective silo filling and unloading operations and
      2. for slow relative sweep rotation about a vertical axis of the assembly;
   B. sweep drive means for slowly rotating the sweep during said filling and unloading operations;
   C. means for mounting an auger on said sweep to depend therefrom in concentric relation to said vertical axis; and
D. auger drive means for rapidly rotating said depending auger
   1. one way, during a silo-filling sweep-rising operation, to render it operative to function as a cylindrical barrier which prevents the incoming silage from lodging within the cylindrical space of the barrier so that said incoming silage builds up a column around said barrier and thus forms a vertical-open-ended silge-discharge hole extending progressively upward from the bottom of the progressively rising column of silage as the rising rotary sweep spreads the incoming silage over the top of the column.

2. The apparatus of claim 1 wherein:
A. said auger drive means is operative for rapidly rotating said depending auger
   1. In the reverse way, during a silo-unloading sweep-lowering operation in which the sweep removes silage from the top of said column and directs it into the upper end of said silage-discharge hole, to render it operative to facilitate the discharge movement of unloading silage downwardly through the upper end portion of said hole toward the open bottom end thereof and contemporaneously ream the adjacent portion of that hole.

* * * * *